United States Patent [19]

Kincs

[11] Patent Number: 5,108,769
[45] Date of Patent: Apr. 28, 1992

[54] STRUCTURED FAT EMULSION IN CONFECTIONERY COATING

[76] Inventor: Frank R. Kincs, 685 Fairview Ave., Bradley, Ill. 60915

[21] Appl. No.: 530,822

[22] Filed: May 30, 1990

[51] Int. Cl.⁵ .......................... A23G 1/00; A23P 1/08
[52] U.S. Cl. ...................................... 426/93; 426/306; 426/307; 426/601; 426/602; 426/659; 426/660
[58] Field of Search ................. 426/93, 601, 602, 604, 426/607, 659, 660, 307, 306

[56] References Cited

U.S. PATENT DOCUMENTS

| | | | |
|---|---|---|---|
| 3,223,532 | 8/1963 | Pinkalla et al. | 99/123 |
| 3,232,765 | 2/1966 | Rosenthal et al. | 99/23 |
| 3,669,681 | 6/1972 | Shoaf et al. | 426/601 |
| 3,694,233 | 9/1972 | Kaplow et al. | 99/150 |
| 4,081,559 | 3/1978 | Jeffery et al. | 426/103 |
| 4,252,834 | 2/1981 | Inamine et al. | 426/321 |
| 4,446,166 | 5/1984 | Giddey et al. | 426/631 |
| 4,464,411 | 8/1984 | Herzing et al. | 426/613 |
| 4,664,927 | 5/1987 | Finkel | 426/613 |
| 4,812,318 | 3/1989 | Finkel | 426/94 |
| 4,837,041 | 6/1989 | Maruzeni et al. | 426/607 |
| 4,847,105 | 7/1989 | Yokobori et al. | 426/607 |
| 4,895,732 | 1/1990 | Suwa et al. | 426/604 |

OTHER PUBLICATIONS

*FORTUNE* Article, "In Hot Pursuit of High-Tech Food", Dec. 23, 1985.

Primary Examiner—Donald E. Czaja
Assistant Examiner—Evan Federman

[57] ABSTRACT

A coating is prepared from a composition of fat, selected polyols, and emulsifier. The coating cooled in the normal enrobing process provides a coated product in which the coating resists the onset of blooming and resists melting at elevated temperatures, while still exhibiting desirable mouth feel and melting properties when the product is consumed. The coating includes a structured fat emulsion that is a polyol-in-fat emulsion which is stable and consistent enough to be distributed as a bulk fat component.

34 Claims, No Drawings

STRUCTURED FAT EMULSION IN CONFECTIONERY COATING

DESCRIPTION

1. Background and Description of the Invention

This invention relates to a fat component for confectionery coatings and the like, coated food products including same, and a process for making and using the confectionery coating. More particularly, the fat component is a structured fat emulsion which can be incorporated directly into a confectionery coating composition when it is formulated and which will not thicken or set up until it passes through the cooling tunnel or the like of the food processing line on which the coating takes place. The structured fat emulsion also raises the heat set properties of the confectionery coating in order to provide a finished product which exhibits the good eating quality of a low melt point fat, but enhanced heat resistance at warmer temperatures.

Various approaches have been taken over the years in order to provide confectionery coatings, such as chocolate coatings or chocolate-flavored coatings, which will exhibit setting characteristics that render them more resistant to softening, melting or deterioration when the products coated therewith are stored or handled at temperatures in excess of room temperature. For example, it has long been an objective to provide set confectionery coatings which will not melt when held in the hand for extended time periods, but which will still melt or allow for break-down of its set property when the coated product is placed into the mouth and consumed.

In addition to the objective of avoiding melting in the hand, another problem which has been addressed in the past regarding confectionery coatings such as chocolate coatings and the like is the development of so-called "bloom." This phenomenon is noticed as the development of a generally white coloration on the surface of chocolate coatings and the like. This white coloration or bloom develops on the surface of confectionery coatings as the set coating ages. It is believed that this bloom develops as fat components within the coating migrate to the surface of the coated product and harden. Often, this bloom development is accelerated if the coated product is stored for long time periods and/or is subjected to temperatures in excess of room temperature, such as would be encountered on a warm summer day.

Included in the approaches that have been taken in the past in order to address the premature melting and bloom development problems are the teachings of U.S. Pat. Nos. 3,223,532, 3,232,765, 4,081,559, and 4,446,166. Included in these approaches have been the use of emulsion systems. These emulsion systems are variously described as water-in-oil emulsions, coatings having a discontinuous fat phase, and water-in-fat emulsions. Another approach is found in U.S. Pat. No. 4,664,927, where a polyol is added after the coating has been tempered and shortly before depositing or forming of the coating. A particular difficulty with this latter approach is the need for extra equipment and processing time in order to incorporate a polyol at the proper time so that premature viscosity build-up of the coating formulation is avoided.

While the polyol addition approach may hold promise to provide enhanced heat resistance and resistance to bloom formation, this is not entirely satisfactory due to the extra handling apparatus, time and attention which are needed in attempting to carry out this procedure. Coating efficiency could be increased and coating expenses could be reduced when compared with this procedure by providing a delayed setting fat component that can be incorporated into the coating formulation much in the same manner as conventional fat components are traditionally added.

It has been determined that, by proceeding in accordance with the present invention, it is possible to provide a component that can be incorporated directly into a confectionery coating without any special equipment or timing, which component successfully retards the onset of bloom development and which resists melting at elevated temperatures. The component includes a structured fat emulsion wherein an ingredient is encapsulated within a fat component which enhances the structure of the coating, providing a set and heat resistance equivalent to that of a higher melting fat component. It has been further determined that, with such a structured fat emulsion incorporated into a confectionery coating, the setting of the coating to one that is bloom-resistant and to one that has high temperature resistance will be delayed until such time as the coated product is subjected to generally normal cooling conditions after coating, enrobing or the like has been completed.

It is a general object of the present invention to provide an improved fat component for confectionery coatings, the method of using same, and confectionery coatings and coated food products incorporating same.

Another object of the present invention is to provide a structured fat emulsion confectionery coating component which is added to a confectionery coating composition much in the same manner as fat components are traditionally incorporated thereinto.

Another object of this invention is to provide a system for developing confectionery coatings, including chocolate coatings, imitation chocolate and chocolate-flavored coatings, that are resistant to bloom development and that have an increased resistance to softening at elevated temperatures.

Another object of the present invention is to provide a coating ingredient that easily and reliably provides coatings that do not melt when handled under substantially normal conditions but will present proper texture and mouth feel when consumed.

These and other objects, features and advantages of the present invention will be clearly understood through a consideration of the following detailed description.

2. Description of the Particular Embodiments

A typical confectionery coating composition can be exemplified by chocolate coatings, imitation chocolate and chocolate-flavored coatings, and the present invention is particularly suitable for such compositions. Coatings of other types, such as coatings incorporating fruit flavors or other flavoring components such as vanilla, can also be advantageously improved according to the present invention. Because of the particular problems that are experienced and/or perceived in connection with the chocolate types of coatings, the present invention is particularly advantageous and useful for chocolate types of coatings.

A usual chocolate coating composition would be expected to include a fat component, cocoa or a chocolate flavoring component, sugar or other suitable sweetener and a dairy component such as milk or milk solids. Other ingredients can be included such as stabilizers, emulsifiers, anti-oxidants and the like. In a typical coating procedure, the fat is melted and is combined with the rest of the ingredients, and the coating mixture is then heated to the proper temperature. Other treatments can be included, such as passing through a refiner or grinder, typically in order to break down the sugar component or the like. Further processing can include so-called conching. Often, chocolate coatings are also tempered by subjecting the melted coating to a specific cooling and heating cycle to form initial crystals which seed the crystallization process in the cooling tunnel. It is also typical to then cool the coated product such as by passing it through a cooling tunnel which is below room temperature, after which the coated product is packaged or further processed.

United States standards of identity allow for a composition to be identified as "chocolate" when the fat component is entirely cocoa butter. Allowances are made for fats from minor components such as milk solids and flavoring agents. When this requirement is not met, such as when the fat used is not cocoa butter, terminology such as "imitation chocolate" or "confectionery coating" can be used. These latter types of coatings are in wide use and are especially suitable for enrobing or coating applications and when it is not desired to form a product which is properly identified as chocolate and which is a shaped article itself that is molded or otherwise formed into a desired shape of its own. One of the disadvantages of including cocoa butter as a fat component is its relatively high cost and the problems that it presents in attempting to achieve a proper heat set at elevated temperatures. Also, hard fat or hard butter components, that is fats which are selectively hydrogenated or selectively hydrogenated and/or fractionated vegetable oils, are traditionally not particularly suitable for use in coating formulations because their melting points are too high, yielding a coating that exhibits a waxy eating quality due in large measure to a poor melting profile that reduces the speed at which the coating melts in the mouth. These types of hard fats also make more difficult the handling of coatings at typical enrobing or coating temperatures.

In accordance with the present invention, the fat component is a structured fat emulsion in which a polyol is emulsified with and encapsulated into a partially hydrogenated fat. It is possible to then simply use this fat component in generally conventional coating equipment and in a generally conventional manner. By proceeding in accordance with the present invention, a fat component is provided for use on industrial baking and food processing lines used to make products such as candy bars, cookies, crackers, doughnuts, cakes, novelty items and the like.

Representative polyols include dihydric alcohols or glycols, trihydric alcohols or glycols, diesters, triesters, sugar syrups such as glucose syrups, and the like and combinations thereof. Representative polyols include glycerol, propylene glycol, hydrogenated glucose syrup, and the like. Glycerol is particularly effective in terms of its superior ability to impart a heat set or bloom resistant structure to coatings incorporating it. Glycerol is also advantageous because of its bland flavor. However, its high viscosity complicates its handling within the fat component and the coating compositions incorporating same. Propylene glycol has the advantage of being thinner and thus easier to handle than glycerol. Its heat setting properties are not as effective as glycerol, although they are acceptable. Also, propylene glycol has a distinct flavor note which typically must be masked in formulating a coating composition. Generally speaking, the polyol is included within the fat component at levels of between about 2 and about 20 weight percent, based upon the total weight of the structured fat emulsion fat component. Preferably, the polyol is included at a concentration of at least about 2 percent of the structured fat emulsion, the most typical or preferred range being between about 3 weight percent and about 6 weight percent.

A suitable fat component of the structured fat emulsion is a partially hydrogenated fat, such as a partially hydrogenated soybean fat or other partially hydrogenated fats. Typically, these partially hydrogenated fats should have a solids content of at least about 50 weight percent at 50° F. Generally speaking, solids contents as high as on the order of about 75 weight percent at 50° F. can be employed. Fats such as palm kernel fat, coconut fat and cocoa butter could be employed if desired.

The structured fat emulsion of this invention is a polyol-in-fat emulsion. Generally speaking, polyols are particularly difficult to incorporate into fat systems. Emulsifier additives can facilitate incorporation, and enhance maintenance of a stable fat emulsion after incorporation. Such incorporation and maintenance is further enhanced by aggressive mixing. In order to achieve adequate mixing of the ingredients into the final fat component, it is important that the polyol be uniformly dispersed throughout the fat system, and homogenization procedures can be particularly useful and advantageous in achieving this objective.

While not wishing to be bound by any theory, it is believed that the polyol assists in aligning fat crystals in order to produce a set product that will resist blooming and will create an elevated apparent melting temperature or resistance to elevated-temperature softening of the confectionery coating. By the invention, this alignment effect is delayed due to the encapsulation of the polyol until processing proceeds through to the cooling stage. In a sense, the invention causes a temporary depressing of the activity of the polyol.

Coatings prepared by utilizing this structured fat emulsion technology form a set coating which eventually resists melting, deformation and/or blooming. This structure can be formed more rapidly by subjecting the coated product to heat treatment. For example, after having achieved the initial set in the cooling tunnel, improved heat setting properties can be realized by providing an enhanced thermal set through storage. For example, storing finished products for two weeks at 70° F., one week at 80° F., or two days at 90° F. results in a product having a thermal set at 100° F., thereby providing a product having enhanced shelf life. More particularly, storage study tests of products coated in accordance with the present invention were found to resist deforming upon storage for 24 hours at 100° F. when the coated product coming out of the cooling tunnel was stored for 14 days at 70° F., or stored for two days at 80° F., or stored for one day at 90° F. By comparison, 94° palm kernel coatings melt rapidly when stored at 100° F., and 102° palm kernel coatings maintain their shape, but become stickier than the coatings in accordance with the present invention when subjected to these 100° F. storage conditions.

As mentioned hereinabove, coating processes can include a tempering procedure, which is generally considered to be a process of pre-crystallization that develops a crystalline seed within the coating, that subsequently leads to a coating having a glossy state or appearance when it exits the cooling tunnel or the like. Certain fats, such as palm kernel and cocoa butter, require tempering, whereas partially hydrogenated soybean fat and partially hydrogenated soybean/cottonseed fats do not require tempering. When these latter types of fats ar included in the structured fat emulsion fat components of this invention, tempering can be eliminated, thereby simplifying the procedure and reducing overall costs.

The following examples are illustrative of some of the aspects of the present invention.

EXAMPLE 1

A structured fat emulsion is prepared by emulsifying 6 percent of glycerol into a partially hydrogenated soybean fat (Tem Plus 95). Also added is about one percent of a mono-di-emulsifier system, and these ingredients are subjected to mixing in a high shear blender for about 10 minutes.

A ⅔ aliquot of this structured fat emulsion is melted and added to conventional quantities of dry coating ingredients, namely 49.7% sugar, 15% cocoa (natural, 10 to 12% fat), 2.2% non-fat milk solids, and 0.1% salt, each percentage being based on the total weight of the coating formulation, in order to form a pasty material. This material is then put into a refiner in order to break down the sugar. The remaining ⅓ aliquot of the structured fat emulsion is melted and combined and processed through conching equipment. The total amount of structure fat emulsion thus added amounted to 33% by weight of the total coating formulation. A food product is enrobed by passing same through a curtain of the chocolate flavored confectionery coating formulation. Because this coating is still of a flowable nature, it readily falls into a holding tank for easy recycling as desired. The thus coated product is passed through a cooling tunnel at about 55° F., and the coating sets in order to form an enrobed food product.

EXAMPLE 2

Glycerol and propylene glycol were blended together in a ratio of 90 to 10, and this blend was emulsified at a level of 6% with the remainder being partially hydrogenated soybean oil, using 0.25% of a mono-diglyceride emulsifier system (Vrest, available from Bunge Foods Corporation). The components were subjected to homogenization conditions within a commercial homogenizer in order to form a bulk dispersion product. The commercial homogenizer, a Microfluidizer M110T available from Microfluidics Corporation of Newton, Mass., was set at a pressure of 7500 psi, and the composition was passed therethrough twice. The liquid bulk dispersion was tested for stability by holding it at 120° F. for in excess of two weeks. No separation was observed.

EXAMPLE 3

The procedure of Example 2 was substantially repeated, except the emulsifier was 0.25% of sorbitan monooleate (S-Maz 80 K, available from Mazer Chemicals of Gurnee, Ill.), and the composition was subjected to a single pass through the Microfluidizer set at a pressure of 3000 psi. This composition also passed the stability test for in excess of two weeks.

EXAMPLE 4

A 90 to 10 blend of glycerol and propylene glycol was mixed into a partially hydrogenated soybean fat at a level of 3%. The mixing proceeded within a Votator (scraped surface heat exchanger) to subject the composition to a quick chilling process in which the liquid composition was rapidly chilled to a temperature of 70° to 85° F., and the structured fat emulsion was solidified into a solid cube suitable for packaging. The cubed structured fat emulsion was used as the fat component of a chocolate flavored confectionery coating formulation according to Example 1, which formulation was used to prepare an enrobed food product.

It will be understood that the embodiments of the present invention which have been described are illustrative of some of the applications of the principles of the present invention. Numerous modifications may be made by those skilled in the art without departing from the true spirit and scope of the invention as defined in the following claims.

What is claimed is:

1. A structured fat emulsion for incorporation with a sweetening component and a flavoring component into a confectionery coating, the structured fat emulsion being the fat ingredient thereof to form a complete confectionery coating formulation which is flowable and remains flowable until it coats a structured food product core, said structured fat emulsion comprising:
   a blend of a polyol component together with a fat component, said blend being a polyol-in-fat emulsion comprising between about 2 and about 20 weight percent polyol based upon the total weight of polyol-in-fat emulsion, said polyol component being emulsified within said fat component,
   whereby said structured fat emulsion effects a time-delay in the setting of a complete confectionery coating formulation which prior to setting is flowable to coat the structured food product core, after which the formulation is subjected to setting conditions to form a set confectionery coating having enhanced heat resistance and bloom development retardation.

2. The structured fat emulsion according to claim 1, wherein said polyol component is present in the emulsion at between about 3 and about 6 weight percent.

3. The structured fat emulsion according to claim 1, wherein the polyol-in-fat emulsion is homogenized.

4. The structured fat emulsion according to claim 1, wherein said structured fat emulsion further includes an emulsifier.

5. The structured fat emulsion according to claim 1, wherein said polyol component is selected from the group consisting of dihydric alcohols, trihydric alcohols, diesters and triesters of alcohols, sugar syrups, and combinations thereof.

6. The structured fat emulsion according to claim 5, wherein said polyol component includes glycerol.

7. The structured fat emulsion according to claim 5, wherein said polyol component is a blend of glycerol and propylene glycol.

8. The structured fat emulsion according to claim 1, wherein said fat component is a partially hydrogenated fat.

9. The structured fat emulsion according to claim 8, wherein said partially hydrogenated fat includes partially hydrogenated soybean fat.

10. The structured fat emulsion according to claim 8, wherein said partially hydrogenated fat has a solids content of between about 50 and about 75 weight percent at 50° F.

11. The structured fat emulsion according to claim 1, wherein said polyol-in-fat emulsion includes an emulsifier and had been prepared by a procedure including homogenization, wherein said polyol component includes glyerol, and wherein said fat component is a partially hydrogenated fat.

12. A process for making and using a confectionery coating, the process comprising:
preparing a structured fat emulsion fat ingredient which is a blend of a polyol component together with a fat component, said blend being a polyol-in-fat emulsion comprising between about 2 and about 20 weight percent polyol, based upon the total weight of the polyol-in-fat emulsion, said polyol component being emulsified within said fat component;
combining said structured fat emulsion fat component with ingredients for a confectionery coating in order to provide a flowable, complete confectionery coating formulation which remains flowable until subjected to setting conditions;
applying said flowable, complete confectionery coating formulation to a food product to be coated; and
subjecting said thus coated food product to setting conditions, whereby said structured fat emulsion thickens said flowable complete confectionery coating into a set confectionery coating on said food product.

13. The process according to claim 12, wherein said combining step includes raising the temperature of the flowable, complete confectionery coating formulation to a handling temperature which is above room temperature, and wherein said setting conditions include cooling the coated food product to a setting temperature below said handling temperature.

14. The process according to claim 13, wherein said setting temperature is no higher than about room temperature.

15. The process according to claim 12, wherein said confectionary coating is a chocolate flavored coating.

16. The process according to claim 12, wherein said polyol component is present in the emulsion at between about 3 and about 6 weight percent.

17. The process according to claim 12, wherein said polyol component is selected from the group consisting of dihydric alcohols, trihydric alcohols, diesters and triesters of alcohols, sugar syrups, and combinations thereof.

18. The process according to claim 12, wherein said fat component is a partially hydrogenated fat.

19. The process according to claim 18, wherein said partially hydrogenated fat has a solids content of between about 50 and about 75 weight percent at 50° F.

20. The process according to claim 12, wherein said polyol-in-fat emulsion includes an emulsifier and had been prepared by a procedure including homogenization, wherein said polyol component includes glyerol, and wherein said fat component is a partially hydrogenated fat.

21. A confectionery coating for applying to the surface of a food product, the confectionery coating comprising a fat ingredient, a sweetening component, and a flavoring component, said fat ingredient being a structured fat emulsion which is a blend of a polyol component together with a fat component, said blend being a polyol-in-fat emulsion comprising between about 2 and about 20 weight percent polyol, based upon the total weight of the polyol-in-fat emulsion, said polyol component being emulsified within said fat component, said structured fat emulsion having been formed prior to combining same with the sweetening component and the flavoring component whereby said confectionery coating, when set, exhibits enhanced heat resistance and bloom retardation properties.

22. The confectionery coating according to claim 21, wherein said flavoring component is a chocolate.

23. The confectionery coating according to claim 21, wherein said polyol component is present in the emulsion at between about 3 and about 6 weight percent.

24. The confectionery coating according to claim 21, wherein said polyol component is selected from the group consisting of dihydric alcohols, trihydric alcohols, diesters and triesters of alcohols, sugar syrups, and combinations thereof.

25. The confectionery coating according to claim 21, wherein said fat component is a partially hydrogenated fat.

26. The confectionery coating according to claim 25, wherein said partially hydrogenated fat has a solids content of between about 50 and about 75 weight percent at 50° F.

27. The confectionery coating according to claim 21, wherein said polyol-in-fat emulsion includes an emulsifier and had been prepared by a procedure including homogenization, wherein said polyol component includes glyerol, and wherein said fat component is a partially hydrogenated fat.

28. A coated food product comprising a structured food product core and a coating thereon, said coating being a set coating formulation including a fat ingredient, a sweetening component and a flavoring component, said fat ingredient being a structured fat emulsion which is a blend of a polyol component together with a fat component, said blend being a polyol-in-fat emulsion comprising between about 2 and about 20 weight percent polyol, based upon the total weight of the polyol-in-fat emulsion, said polyol component being emulsified within said fat component, and said polyol-in-fat emulsion had been formed prior to combining same with the sweetening component and the flavoring component whereby said coated food component is a complete confectionery coating formulation which remains flowable until subjected to setting conditions at which time said set coating formulation exhibits enhanced heat resistance and bloom retardation properties.

29. The coated food product according to claim 28, wherein said flavoring component is chocolate.

30. The coated food product according to claim 28, wherein said polyol component is present in the emulsion at between about 3 and about 6 weight percent.

31. The coated food product according to claim 28, wherein said polyol component is selected from the group consisting of dihydric alcohols, trihydric alcohols, diesters and triesters of alcohols, sugar syrups, and combinations thereof.

32. The coated food product according to claim 28, wherein said fat component is a partially hydrogenated fat.

33. The coated food product according to claim 32, wherein said partially hydrogenated fat has a solids content of between about 50 and about 75 weight percent at 50° F.

34. The coated food product according to claim 28, wherein said polyol-in-fat emulsion includes an emulsifier and had been prepared by a procedure including homogenization, wherein said polyol component includes glyerol, and wherein said fat component is a partially hydrogenated fat.

* * * * *

UNITED STATES PATENT AND TRADEMARK OFFICE
CERTIFICATE OF CORRECTION

PATENT NO. : 5,108,769

DATED : April 28, 1992

INVENTOR(S) : Frank R. Kincs

It is certified that error appears in the above-identified patent and that said Letters Patent is hereby corrected as shown below:

Col. 5, line 7, "ar" should read --are--; line 54, "7500" should read --750--.
Col. 6, line 33, "polyol based" should read --polyol, based--.

Signed and Sealed this

Twelfth Day of July, 1994

Attest:

*Attesting Officer*

BRUCE LEHMAN

*Commissioner of Patents and Trademarks*